Patented Mar. 3, 1953

2,630,426

UNITED STATES PATENT OFFICE 2,630,426

TREATMENT OF ROSIN SOAPS, AND USE OF RESULTING SOAPS IN EMULSION POLYMERIZATION

Carl A. Uraneck, Borger, Tex., and Spencer H. Landes, Stillwater, Okla., assignors to Phillips Petroleum Company, a corporation of Delaware No Drawing. Application June 9, 1950, Serial No. 167,248

17 Claims. (Cl. 260—83.7)

This invention relates to a treatment of rosin soaps, and to the use of resulting treated rosin soaps in emulsion polymerization of unsaturated organic monomeric materials. In one embodiment this invention relates to an improved process for producing synthetic rubber.

It is well known in the art that a variety of emulsifying agents may be employed when carrying out emulsion polymerization reactions. It is also recognized that rosin soaps are preferred in many instances to other types of emulsifying agents. When so employed rosin acids remain in the product and their presence is known to give improved properties, particularly flex life and tack.

The use of rosin soaps as emulsifiers for polymerization reactions has been limited on account of their activity or, to state it differently, the retarding effect they exert when so employed. While certain of the rosin soaps are sufficiently active to be of practical value as emulsifying agents in polymerization reactions, others appear to inhibit polymerization.

We have now discovered a method for the treatment of rosin soaps whereby those materials which have heretofore not been applicable as emulsifying agents for polymerization reactions are now made operable and other rosin soaps which are already known to function more or less satisfactorily are rendered still more active. The treatment comprises an activation procedure in which the rosin soap is contacted with hydrogen peroxide under such conditions as to effect the desired increase in activity. Our treatment is applied not only to soaps prepared from acids and mixtures of acids, found in natural rosins, but also from acids and acid mixtures resulting from hydrogenation and from the well known disproportionation of acids present in natural rosin. Materials of the type which are more usually employed include commercial abietic acid, hydrogenated rosin acids, tall oils which are either the crude or refined materials, acid from wood rosins, and the like. The soaps of disproportionated rosin acids, which are known to be applicable as emulsifiers, are rendered more active when treated according to this process.

An object of the present invention is to provide an improved process for the treatment of rosin soaps, for use in emulsion polymerization.

An object of this invention is to effect an improved polymerization of unsaturated organic compounds while dispersed in an aqueous medium.

A further object of this invention is to obtain an improved emulsion polymerization of an unsaturated organic material when a rosin soap is used as an emulsifying agent.

Another object of this invention is to improve the properties of soaps of rosin acids, and of soaps of derivatives of rosin acids, as indicated by improvements when these are used in emulsion polymerization.

Further objects and advantages of this invention will become apparent, to one skilled in the art, from the accompanying disclosure and discussion.

According to one embodiment of this invention, a rosin soap is first prepared from the corresponding acid by neutralization of the acid with an aqueous solution of an alkali metal hydroxide such as sodium, potassium, or lithium hydroxide, or with an aqueous solution of ammonia. Of the hydroxides employed, those of sodium and potassium are most generally preferred. The resulting rosin soap solution is then treated with an aqueous solution of hydrogen peroxide.

Treatment of rosin soap with hydrogen peroxide can be carried out at room temperature, i. e., about 65 to 80° F., but it is generally preferred to operate at higher temperatures in order to effect reaction in a shorter time. The temperature will generally be in the range from 100° F. to the boiling point of the mixture and more frequently it will be 120° F. or higher. The pH during treatment should be above 7. When the hydrogen peroxide is added, the mixture is stirred in order that the materials be intimately contacted and, if desired, stirring may be continued throughout the heating period although this is not mandatory. Heating is continued at least until no unreacted hydrogen peroxide remains, preferably from 5 to 30 minutes after obtaining a negative potassium iodide-starch test. If desired, a small amount of an alkaline reacting salt can be present during treatment to enhance the action of the peroxide on the rosin soap. Examples of such salts are trisodium phosphate, sodium metasilicate, sodium pyrophosphate, sodium carbonate, sodium metaphosphate, the corresponding potassium and ammonium salts. Mixtures of two or more alkaline reacting salts can also be used. Preferably the salt is added to the soap solution prior to addition of hydrogen peroxide thereto.

The concentration of the hydrogen peroxide employed may vary over a broad range. In general hydrogen peroxide of any concentration that is commercially available is applicable. The aqueous solutions most frequently used range from 3 per cent to 50 per cent solutions with concentrations of 10 per cent or greater generally preferred.

The amount of hydrogen peroxide employed in the treatment of rosin soap will vary with the material to be treated. Generally it is in the range from 0.02 to 50 millimols per one gram of rosin soap which, in the case of potassium abietate, is 2.94 millimols. The amount of hydrogen peroxide most generally preferred is in the range from 0.5 to 20 millimols per one gram of rosin soap.

The time required for the activation procedure is dependent upon several factors. It is governed by the kind of rosin soap treated, temperature of treatment, and concentration of hydrogen peroxide solution employed. As hereinbefore stated, treatment is continued until certain no hydrogen peroxide remains. A negative starch-iodide test must at least be obtained, and preferably the heating is continued for a short time thereafter as indicated above.

The above described procedure for rosin soap activation represents only one embodiment of the invention. Numerous variations may be introduced which, in some instances, have a still further activating effect on the soap. For example, after treatment of the rosin soap with the hydrogen peroxide, it is sometimes desirable to liberate the rosin acid by the addition of an acid, such as hydrochloric acid, and then to separate and subsequently reconvert the liberated rosin acid to a soap by the addition of an alkali metal hydroxide, such as sodium or potassium hydroxide.

It is also sometimes preferred to treat the rosin soap separately with a hypohalogen compound, for example an alkali metal hypochlorite, and hydrogen peroxide in order to get an improved activating effect. In such instances it is very much preferred that the hypochlorite treatment be done first and then the hydrogen peroxide treatment. With this method of activation of rosin soap, a much smaller quantity of hydrogen peroxide is necessary than is ordinarily required when hydrogen peroxide is used alone. Furthermore, this combined treatment is more effective than when hypochlorite is used alone. Activation of rosin soaps by treatment with alkali metal hypochlorites and other hypohalogen compounds is described in our copending application, Serial No. 104,808, filed July 14, 1949. When a treatment of rosin soaps with a hypohalite and hydrogen peroxide separately is made in accordance with the present invention, the hypohalite treatment is done under the conditions described in said copending application, to which reference is hereby made. These conditions in general include temperatures of 30 to 220° F., with room temperature, i. e. about 65 to 80° F., being most often used. From 0.05 to 6 millimols hypohalogen compound per one part of rosin soap is ordinairly adequate; the range of 0.2 to 2 millimols is preferred. Suitable hypohalogen compounds include hypohalogen acids and their alkali metal salts. Examples of the treating materials most frequently employed are hypochlorous and hypobromous acids and the corresponding sodium and potassium salts.

Rosin soaps, which are ordinarily not applicable for use as emulsifying agents in polymerization reactions, may be made operable when treated according to the activating procedures, herein described. In some recipes, particularly when operating at low temperatures, it has frequently been necessary to use emulsifiers other than rosin soaps in order to obtain satisfactory conversion rates. With the activating treatment of this invention the applicability of rosin soaps has been increased and they may now be employed to give satisfactory conversion rates in polymerization recipes and under conditions where it was once necessary to use other emulsifying agents. Inexpensive rosin soaps which have been considered of little value in polymerization work, on account of the inhibiting effect they exert on the reactions, are now made operable by this activating treatment. The invention therefore has certain economic advantages.

Rosin soaps which have been activated according to the method of this invention can be employed alone as emulsifying agents in polymerization reactions, or they can be used in admixture with various other emulsifying agents such as fatty acid soaps, alkyl and aryl sulfates and sulfonates, and the like. They are applicable in all kinds of emulsion polymerization systems such as those of the GR-S type, in which a persulfate is the reaction initiator, or in various activated recipes such as the peroxide-redox recipes, the diazothioether - ferricyanide - mercaptan recipe, the hydroperoxide-amine recipes, etc. Temperatures which are employed for carrying out these reactions are usually found within the range of −40 to 160° F. The invention is particularly useful in those recipes in which an oxidant is used together with an activator-reductant, especially when the oxidant is an organic hydroperoxide, or alkali metal salt thereof, and the activator-reductant is a composition comprising an alkali metal pyrophosphate-ferrous salt composition, with or without an organic reductant such as a reducing sugar, or the activator-reductant is a diamino compound, such as one or more of hydrazine, ethylenediamine, diethylenetriamine, ethylene(methylethylene)triamine, tetraethylenepentamine, and the like. These compounds have the general formula $$RHN(CHXCHXNH)_m(CHXCHX)_nNHR$$

where each R contains not more than eight carbon atoms and is of the group consisting of hydrogen, saturated and unsaturated aliphatic and cycloaliphatic, and aryl, radicals, and each X contains not more than three carbon atoms and is of the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and can be of mixed character when containing six or more carbon atoms, such as alkylcycloalkyl, aralkyl, alkaryl groups, and the like, and can also have non-hydrocarbon substituents, some of which will have the effect of making them more water soluble and less oil (hydrocarbon)-soluble; particularly useful non-hydrocarbon substituents include oxygen in the form of hydroxy and ether compounds, sulfur in similar compounds (i. e., mercapto compounds and thioethers), and halogen compounds. In such recipes the amine-type compound used appears to act both as a reductant and as an activator, and no other activating ingredients, such as compounds of polyvalent-multivalent metals, or reducing ingredients, such as a reducing sugar, need be present in order to obtain satisfactory and rapid polymerization of the monomeric material, even at temperatures below the normal freezing point of water. The amount of amine-type compound used to obtain optimum results also is dependent upon other ingredients in the recipe. Preferred results are usually obtained with between 0.02 to 5 parts by weight, per 100 parts of monomeric material, of the amine-type compound. In other recipes a composition is used which comprises the compound which is an oxidation catalyst, or activator, and another different compound which is a reductant. The oxidation catalyst is generally selected from a group of materials consisting of compounds of metals such as iron, manganese, copper, vanadium, cobalt, etc. In general it is assumed that the metal must be a multivalent metal and in such a condition that it can change its valence state reversibly. The other ingredient ordinarily present is a reductant, and is usually an organic material such as a reducing sugar or other easily oxidizable polyhydroxy compound. Compounds frequently employed in this capacity are glucose, levulose, sorbose, invert sugar, and the like. The multivalent metal ion of the oxidation catalyst can easily and readily pass from a low valence state to a higher valence state, and vice versa. Sometimes this compound, when present in its lower valence state, can function in the dual role of reductant and oxidation catalyst. One commonly used oxidation catalyst is an iron pyrophosphate, and is separately made up in aqueous solution from a ferrous salt, such as ferrous sulfate, and a pyrophosphate of an alkali metal, such as sodium or potassium.

In effecting emulsion polymerization of a monomeric material, particularly when a batch-type or semi-batch-type operation is carried out, the reactor is usually first charged with the aqueous medium, which contains the desired emulsifying agent comprising a rosin acid soap treated in accordance with this invention, and the monomeric material is then admixed with agitation of the contents. At the same time a reaction modifier, such as a mercaptan, is also included, usually in solution in at least a part of the monomeric material. An activator solution and an oxidant are separately added to the reaction mixture, and reaction then proceeds. A preferred manner of adding these two constituents is usually to have the activator solution incorporated in the aqueous medium prior to addition of the monomeric material, and to add the oxidant as the last ingredient. Sometimes, however, satisfactory polymerization results can be obtained when this procedure is reversed. It is also sometimes the practice to add portions of one or the other of the activator solutions and oxidant intermittently, or continuously, during the course of the reaction. If the operation is carried out continuously, streams of the various ingredients are admixed in somewhat the same order prior to their final introduction into the polymerization reaction zone.

As previously stated, it is usually desirable that the multivalent metal be present in its lower valence state. With some recipes, it is unnecessary to include an organic reducing agent either in the activator solution or in the polymerization mixture. However, particularly at temperatures above 32° F., a faster reaction is sometimes obtained with some recipes when a small amount of an organic reducing agent, such as a reducing sugar, is included in the polymerization recipe, and it is frequently more desirable to incorporate this in the reaction system by first including it in the activator solution along with the other ingredients. When the multivalent ion is present in its higher valence state, it is usually necessary to include in the activator solution an organic reducing agent. As a result the multivalent ion will be partially reduced and a substantial amount of the multivalent ion will be present in its lower valence state when the activator solution is ready for addition to the polymerization mixture.

It is usually preferred that the multivalent metal ion be iron, and the activator solution may be prepared from any of the readily available soluble iron salts, such as ferrous sulfate, ferric sulfate, ferrous nitrate, and the like. A pyrophosphate of sodium or potassium is also usually used in preparing the activator solution. Apparently the ferrous salt and the pyrophosphate interreact to form some kind of a complex compound.

The amounts of activator ingredients are usually expressed in terms of the monomers charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however, the narrower range of 0.2 to 2.5 millimols is more frequently preferred. The mol ratio of ferrous salt to alkali metal pyrophosphate can be between 1:0.2 and 1:3.5, with a preferred ratio between 1:0.35 and 1:2.8.

The pH of the treated emulsifiers can vary over a wide range, that is, satisfactory polymerization rates are obtained when emulsifiers are employed which are in the pH range from 8 to 13. The optimum pH, however, is generally within the range from 9 to 11.5.

The monomeric material polymerized to produce polymers by the process of this invention comprises unsaturated organic compounds which generally contain the characteristic structure $CH_2=C<$ and, in most cases, have at least one of the disconnected valencies attached to an electronegative group, that is, a group which increases the polar character of the molecule such as a chlorine group or an organic group containing a double or triple bond such as vinyl, phenyl, cyano, carboxy or the like. Included in this class of monomers are the conjugated butadienes or 1,3-butadienes such as butadiene (1,3-butadiene), 2,3-dimethyl-1,3-butadiene, isoprene, piperylene, 3-furyl-1,3-butadiene, 3-methoxy-1,3-butadiene and the like; haloprenes, such as chloroprene (2-chloro-1,3-butadiene), bromoprene, methylchloroprene (2-chloro-3-methyl-1,3-butadiene), and the like; aryl olefins such as styrene, various alkyl styrenes, p-chlorostyrene, p-methoxystyrene, alpha-methylstyrene, vinylnaphthalene and similar derivatives thereof, and the like; acrylic and substituted acrylic acids and their esters, nitriles and amides such as acrylic acid, methacrylic acid, methyl acrylate, ethyl acrylate, methyl alpha-chloroacrylate, methyl methacrylate, ethyl methacrylate, butyl methacrylate, methyl ethacrylate, acrylonitrile, methacrylonitrile, methacrylamide and the like, methyl isopropenyl ketone, methyl vinyl ketone, methyl vinyl ether, vinylethinyl alkyl carbinols, vinyl acetate, vinyl chloride, vinylidene chloride, vinylfurane, vinylcarbazole, vinylacetylene and other unsaturated hydrocarbons, esters, alcohols, acids, ethers, etc., of the types described. Such unsaturated compounds may be polymerized alone, in which case simple linear polymers are formed, or mixtures of two or more of such compounds which are copolymerizable with each other in aqueous emulsion may be polymerized to form linear copolymers.

The process of this invention is particularly effective when the monomeric material polymerized is a polymerizable aliphatic conjugated diolefin or a mixture of such a conjugated diolefin with lesser amounts of one or more other compounds containing an active $CH_2=C<$ group which are copolymerizable therewith such as aryl olefins, acrylic and substituted acrylic acids, esters, nitriles and amides, methyl isopropenyl ketone, vinyl chloride, and similar compounds mentioned hereinabove. In this case the products of the polymerization are high molecular weight linear polymers and copolymers which are rubbery in character and may be called synthetic rubber. Often preferred as reactants are conjugated dienes having not more than six carbon atoms per molecule. Although, as can be readily deduced from the foregoing, there is a host of possible reactants, the most readily and commercially available monomers at present are butadiene itself (1,3-butadiene) and styrene. The invention will, therefore, be more particularly discussed and exemplified with reference to these typical reactants. With these specific monomers, it is usually preferred to use them together, in relative ratios of butadiene to styrene between 65:35 and 90:10 by weight.

It is frequently desirable to include water-soluble components in the aqueous phase, particularly in order to depress the freezing point when the polymerization temperature is below the normal freezing point of water. Inorganic salts and alcohols can be so used. Examples of suitable salts are those of ammonium, and alkali and alkali earth metals, including chlorides, nitrates, sulfates, etc. Alcohols which are applicable comprise water-soluble compounds of both monohydric and polyhydric types, including methanol, ethylene glycol, glycerol and erythritol by way of example.

It is generally preferred that the emulsion be of an "oil in water" type, with the ratio of aqueous medium to monomeric material between about 0.5:1 and about 2.75:1, in parts by weight. It is frequently desirable to include water-soluble components in the aqueous phase, particularly when the polymerization temperatures are below freezing. Inorganic salts and alcohols can be so used as indicated hereinabove. The amount of alcoholic ingredient used in a polymerization recipe must be sufficient to prevent freezing of the aqueous phase and generally ranges from 20 to 80 parts per 100 parts of monomers charged. In most cases the amount of water employed is sufficient to make the total quantity of the alcohol-water mixture equal 150 to 200 parts. In cases where it is desired to use a larger quantity of the alcohol-water mixture, say around 250 parts, the amount of alcohol may be increased to as much as 120 parts. It is preferred that the alcohol be such that it is substantially insoluble in the non-aqueous phase, and that 90 per cent, or more, of the alcohol present be in the aqueous phase. A high-boiling alcohol such as glycerine is difficult to recover from the resulting serum; a low-boiling alcohol such as methanol is easily removed and frequently preferred. Other aliphatic alcohols which are higher-boiling than methanol, such as propanol, are frequently less satisfactory. If the resulting latex tends to gel at low reaction temperatures, a larger proportion of aqueous phase should be used. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. Usually 50 to 98 per cent of the monomeric material is polymerized.

The pH of the aqueous phase may be varied over a rather wide range without producing deleterious effects on the conversion rate or the properties of the polymer. In general the pH may be within the range of 9.0 to 12.0, with the narrower range of 9.5 to 10.5 being generally preferred. When a polyamino compound is used as a reductant, somewhat higher pH is preferred.

In preparing synthetic rubber by polymerizing conjugated dienes by the process of this invention, it is usually desirable to use a polymerization modifying agent. Preferred polymerization modifiers are alkyl mercaptans, and these may be of primary, secondary, or tertiary configurations, and generally range from $C_8$ to $C_{16}$ compounds, but may have more or fewer carbon atoms per molecule. Mixtures or blends of mercaptans are also frequently considered desirable and in many cases are preferred to the pure compounds. The amount of mercaptan employed will vary, depending upon the particular compound or blend chosen, the operating temperature, the freezing point depressant employed, and the results desired. In general, the greater modification is obtained when operating at low temperatures and therefore a smaller amount of mercaptan is added to yield a product of a given Mooney value, than is used at higher temperatures. In the case of tertiary mercaptans, such as tertiary $C_{12}$ mercaptans, blends of tertiary $C_{12}$, $C_{14}$, and $C_{16}$ mercaptans, and the like, satisfactory modification is obtained with 0.05 to 0.3 part mercaptan per 100 parts monomers, but smaller or larger amounts may be employed in some instances. In fact, amounts as large as 2.0 parts per 100 parts of monomers may be used. Thus the amount of mercaptan is adjusted to suit the case at hand.

When carrying out polymerization reactions according to the process of this invention, it is frequently considered desirable to include an electrolyte in the system, such as potassium chloride, trisodium phosphate, or other salt which will not produce deleterious effects. One function of an electrolyte is to increase the fluidity of the latex, and it also reduces precoagulation. Generally the amount of such salt will not exceed one part by weight per 100 parts of monomers. When an alkaline reacting salt is employed during the treatment of the rosin acid soap with hydrogen peroxide as discussed hereinabove, it can be allowed to remain in the resulting aqueous solution of treated rosin acid soap which is introduced into the polymerization recipe as emulsifier, whereupon the said salt, for example trisodium phosphate, will have the desired functions in the emulsion just discussed including increasing the fluidity and reducing precoagulation. When this is done, the amount of the salt used during the hydrogen peroxide treatment will be chosen to give the desired salt content in the emulsion, i. e. up to 1 part (per 100 parts monomer) and often in the range of 0.1 to 0.5 part.

The amount of emulsifier, comprising a hydrogen peroxide-treated rosin acid soap, to be used to obtain optimum results is somewhat dependent upon the relative amounts of monomeric material and aqueous phase, the reaction temperature, and the other ingredients of the polymerization mixture. Usually an amount between 0.3 and 5 parts by weight per 100 parts of monomeric material is found to be suitable.

Some of the advantages of this invention are illustrated by the following examples. The reactants, and their proportions, and the other specific ingredients of the recipes are presented as being typical and should not be construed to limit the invention unduly.

Example I

The following recipe was employed for carrying out a series of polymerization runs at 41° F.

| | Parts by weight |
|---|---|
| Butadiene | 72 |
| Styrene | 28 |
| Water, total | 180 |
| Emulsifier | 5 |
| Mercaptan blend [1] | 0.24 |
| Diisopropylbenzene hydroperoxide | 0.126 (0.65 millimol) |
| Dextrose, KOCl treated [2] | 0.25 |
| Activator [3]: | |
| FeSO$_4$.7H$_2$O | 0.14 (0.5 millimol) |
| K$_4$P$_2$O$_7$ | 0.165 (0.5 millimol) |

[1] A blend of tertiary C$_{12}$, C$_{14}$, and C$_{16}$ aliphatic mercaptans in a ratio of 3:1:1 parts by weight.
[2] For the dextrose treatment, 5 grams of dextrose, 80 ml. water, and 20 ml. of a 6.5 per cent solution of potassium hypochlorite were heated at 140° F. until the evolution of gas ceased. A portion of this material was then used in the polymerization recipe.
[3] The activator composition was prepared by heating 1.4 grams FeSO$_4$.7H$_2$O, 1.65 grams K$_4$P$_2$O$_7$, and sufficient water to make 100 ml. of solution at 140° F. for 50 minutes. The resulting composition was charged in the quantity necessary to give the desired amount of ferrous sulfate and potassium pyrophosphate in the polymerization recipe.

The emulsifier employed was the potassium salt of a commercial grade of abietic acid crystals prepared from tall oil and known as Tallex. The abietic acid was treated first with an aqueous solution of potassium hydroxide to form the soap. An aqueous solution of the soap of about 5 per cent concentration and having a pH of 10.3 was prepared. This soap solution was then treated with varying amounts of a 30 per cent aqueous solution of hydrogen peroxide. The mixture was stirred initially and heated at 140° F. for a little longer than required to obtain a negative starch-iodide test. In each instance 5 parts of the soap was treated with the quantity of hydrogen peroxide desired. Two-tenths gram of Na$_3$PO$_4$.12H$_2$O per 5 grams soap was present in the soap solution, this latter material being included to enhance the action of the hydrogen peroxide on the soap. Thus the recipe contained 0.2 part Na$_3$PO$_4$.12H$_2$O during polymerization.

The treated soap solution was charged to the reactor followed by the dextrose, a mixture of the styrene, mercaptan, and hydroperoxide, and then the butadiene. The temperature was adjusted to 41° F. and the activator composition introduced. During the polymerization the temperature was held at 41° F. The results obtained using different quantities of hydrogen peroxide to treat the potassium Tallex are shown below. For purposes of comparison a control polymerization was made using a sample of untreated rosin soap.

| Soap Treatment— Millimols H$_2$O$_2$ per 5 parts Soap | Conversion, Percent | |
|---|---|---|
| | 5.0 Hours | 21.0 Hours |
| 4 | 9 | 36 |
| 10 | 8 | 38 |
| 20 | 15 | 70 |
| No Treatment | 6 | 18 |

Example II

A series of polymerization runs was made using the following recipe:

| | Parts by weight |
|---|---|
| Butadiene | 72 |
| Styrene | 28 |
| Water, total | 180 |
| Potassium abietate | 4.7 |
| Tert-butylisopropylbenzene hydroperoxide | 0.104 (0.5 millimol) |
| Mercaptan blend [1] | 0.24 |
| Dextrose, KOCl treated [1] | 0.25 |
| Activators [1] | |
| FeSO$_4$.7H$_2$O | 0.14 (0.5 millimol) |
| K$_4$P$_2$O$_7$ | 0.165 (0.5 millimol) |

[1] As in example I.

For the first run 4.7 parts of potassium abietate in solution was treated at room temperature (about 75° F.) for a few minutes with 4 millimols of potassium hypochlorite in aqueous solution, and this mixture was then heated to 140° F. and treated with one millimol of hydrogen peroxide in the form of a 30 per cent solution of hydrogen peroxide. Heating was continued until no unreacted hydrogen peroxide remained. For the second run the potassium abietate solution was treated with 4 millimols of potassium hypochlorite but no hydrogen peroxide was added. In the third run untreated potassium abietate was used.

The activator was prepared and the dextrose treated as given in Example I. Polymerization was effected at 41° F. The following results were obtained:

| Rosin Soap Treatment | Conversion, Percent | |
|---|---|---|
| | 16 Hours | 22 Hours |
| KOCl/H$_2$O$_2$ | 55 | 67 |
| KOCl | 36 | 36 |
| None | 15 | 15 |

In these runs it is shown that only one millimol of hydrogen peroxide gives excellent results when used in combination with potassium hypochlorite whereas in Example I a much larger quantity of hydrogen peroxide, when used alone, was required to give similar results in a 21 or 22 hour reaction period. These results also demonstrate the advantage of hydrogen peroxide treatment over hypochlorite treatment alone.

Example III

A potassium rosin soap (prepared from a commercial grade of wood rosin and known to the trade as N-wood rosin) was treated with potassium hypochlorite and then with hydrogen peroxide and the resulting material employed as the emulsifier in the following 41° F. polymerization recipe:

| | Parts by weight |
|---|---|
| Butadiene | 72 |
| Styrene | 28 |
| Water, total | 180 |
| Emulsifier | 4.7 |
| Tert-butylisopropylbenzene hydroperoxide | 0.14 (0.7 millimol) |
| Mercaptan blend [1] | 0.2 |
| Dextrose, KOCl treated [1] | 0.25 |
| Activators [1] | |
| FeSO$_4$.7H$_2$O | 0.19 (0.7 millimol) |
| K$_4$P$_2$O$_7$ | 0.23 (0.7 millimol) |

[1] As in Example I.

A potassium rosin soap solution prepared from a commercial grade of wood rosin designated as N-wood rosin and potassium hydroxide, was treated at room temperature, i. e. about 70 to 75° F., with a solution of potassium hypochlorite in such amount that 2 millimols of the hypochlorite was introduced per 4.7 parts of the rosin soap. This mixture was then treated with a 30 per cent aqueous solution of hydrogen peroxide in such amount that 10 millimols of the peroxide was present per 4.7 parts of the rosin soap. The material was heated to 140° F. and maintained at this temperature until no unreacted hydrogen peroxide remained as evidenced by a negative potassium iodide-starch test, and the heating continued for a short time thereafter.

A different portion of the same potassium rosin soap solution was treated with the same quantities of hydrogen peroxide and potassium hypochlorite at the same conditions, but in the reverse order, i. e. the peroxide treatment was done first, followed by the hypochlorite treatment.

The charging procedure was the same as that described in Example I. Polymerization was effected at 41° F. One run was made using untreated rosin soap. The following results were obtained:

| Rosin Soap Treatment | Conversion, Percent | |
|---|---|---|
| | 5.5 Hours | 22 Hours |
| KOCl/H₂O₂ | 8 | 40 |
| None | 6 | 5 |
| H₂O₂/KOCl | 14 | 16 |

*Example IV*

The following recipe was used for carrying out a series of butadiene-styrene copolymerizations at 41° F.:

Parts by weight
Butadiene _____ 70
Styrene _____ 30
Water, total _____ 180
Rosin soap, K salts [1] ___ 5
Mercaptan blend [2] _____ 0.25
Hyproperoxide _____ Variable (2.0 millimols)
Tetraethylenepentamine 0.756 (4.0 millimols)
Trisodium phosphate,
  Na₃PO₄.12H₂O _____ 0.0 or 0.2

[1] Dresinate 214 (mixture of S salts of dehydro-, dihydro- and tetra-hydroabietic acids.)
[2] As in Example I.

Seven different hydroperoxides were used in these runs and the polymerizations were made using untreated and hydrogen peroxide treated rosin soap. For treating the soap, 5 millimols hydrogen peroxide was used per 5 parts of soap and 0.2 part trisodium phosphate was added to enhance the treatment. No trisodium phosphate was present in the runs in which untreated soap was used.

A mixture of the emulsifying agent and water was charged to the reactor and potassium hydroxide added to adjust the pH to 11. A solution of the hydroperoxide and mercaptan in styrene was then introduced followed by the butadiene. The reactor was pressured to 30 pounds per square inch gauge with nitrogen and the temperature adjusted to 41° F. Sufficient water (10 ml.) was added to the tetraethylenepentamine to make a solution and this mixture was then charged to the reactor. The data are recorded in the following table:

| Hydroperoxide | Conversion, Percent | | | | | |
|---|---|---|---|---|---|---|
| | H₂O₂ Treated Soap | | | Untreated Soap | | |
| | 1 Hour | 3 Hours | 6 Hours | 1 Hour | 3 Hours | 6 Hours |
| Tert-butylisopropylbenzene | 11 | 42 | 60 | 3 | 11 | 15 |
| Triisopropylbenzene | 7 | 43 | 78 | 4 | 21 | 29 |
| Phenylcyclohexane | 18 | 54 | 57 | 10 | 24 | 30 |
| Diisopropylbenzene | 6 | 29 | 71 | 1 | 10 | 17 |
| 1,2,3,4,4a,9,10,10a-octahydrophenanthrene | 25 | 54 | 56 | 18 | 31 | 34 |
| Dodecyltoluene | 3 | 10 | 27 | 2 | 7 | 13 |
| Cumene | 3 | 15 | 38 | 0 | 7 | 11 |

As will be evident to those skilled in the art, various modifications of this invention can be made, or followed, in the light of the foregoing disclosure and discussion, without departing from the spirit or scope of the disclosure or from the scope of the claims.

We claim:

1. In the polymerization of a monomeric material comprising 1,3-butadiene while dispersed in an aqueous emulsion in the presence of an emulsifying agent under polymerization conditions to produce synthetic rubber, in the presence of an initiator composition comprising an organic hydroperoxide and an activator-reductant composition, the improvement which comprises incorporating in said aqueous medium prior to said polymerization as an emulsifying agent potassium abietate which has been mixed and treated in aqueous solution having a pH above 7 and at a temperature of from 100° F. to the boiling point of the solution with 0.5 to 20 millimols of hydrogen peroxide per part by weight of said potassium abietate.

2. In the polymerization of a monomeric material comprising 1,3-butadiene while dispersed in an aqueous emulsion in the presence of an emulsifying agent under polymerization conditions to produce synthetic rubber, in the presence of an initiator composition comprising an organic hydroperoxide and an activator-reductant composition, the improvement which comprises incorporating in said aqueous medium prior to said polymerization as an emulsifying agent a mixture of potassium salts of dehydroabietic, dihydroabietic and tetrahydroabietic acids which has been mixed and treated in aqueous solution having a pH above 7 and at a temperature above room temperature with 0.5 to 20 millimols of hydrogen peroxide per part by weight of said potassium salts.

3. In the polymerization of a monomeric material comprising 1,3-butadiene while dispersed in an aqueous emulsion in the presence of an emulsifying agent under polymerization conditions to produce synthetic rubber, in the presence of an initiator composition comprising an organic hydroperoxide and an activator-reductant composition, the improvement which comprises incorporating in said aqueous medium prior to said polymerization as an emulsifying agent at least one salt of an alkali metal and a rosin acid of the class consisting of natural rosin acids and hydrogenation, dehydrogenation, and disproportionation reaction products thereof having the same number of carbon atoms per molecule and the same arrangement of carbon atoms as said natural rosin acids, said salt being obtained from mixing and treating an alkali metal salt of said acid with 0.02 to 50 millimols hydrogen peroxide per part by weight of said salt while in aqueous solution having a pH above 7.

4. The process of claim 3 in which prior to said mixing and treating with hydrogen peroxide, said salt is mixed and treated in aqueous solution with 0.05 to 6 millimols of a hypohalogen compound per part by weight of said salt.

5. The process of claim 3 in which a small amount of an alkaline reacting salt sufficient to enhance the effect of said treating is present during said treating.

6. In the manufacture of a synthetic rubber-like material by copolymerization of a monomeric material comprising a major portion of 1,3-butadiene and a minor portion of styrene while dispersed in an aqueous emulsion in the presence of a soap emulsifying agent, under polymerization conditions, the improvement which comprises effecting said polymerization in the presence of, as an emulsifying agent, a soap which is a salt of an alkali metal and at least one rosin acid of the class consisting of natural rosin acids and hydrogenation, dehydrogenation, and disproportionation reaction products thereof having the same number of carbon atoms per molecule and the same arrangement of carbon atoms as said natural rosin acids, which salt has been mixed and treated with hydrogen peroxide while in an aqueous solution having a pH above 7 and at a temperature between room temperature and the boiling point of said aqueous solution, said hydrogen peroxide being employed in an amount between 0.02 and 50 millimols per part by weight of said rosin acid salt.

7. In the manufacture of a linear polymer of high molecular weight by polymerization of a monomeric material comprising an organic compound containing an active $CH_2=C<$ group while dispersed in an aqueous medium in the presence of a soap emulsifying agent, under polymerization conditions, the improvement which comprises effecting said polymerization in the presence of, as an emulsifying agent, a soap which is a salt of a rosin acid and which has been mixed and treated with 0.02 to 50 millimols hydrogen peroxide per part by weight of said soap while in an aqueous solution having a pH above 7.

8. In the manufacture of a linear polymer of high molecular weight by polymerization of a monomeric material comprising an organic compound containing an active $CH_2=C<$ group while dispersed in an aqueous medium in the presence of a soap emulsifying agent, under polymerization conditions, the improvement which comprises effecting said polymerization in the presence of, as an emulsifying agent, a soap which is a salt of a rosin acid and which has been mixed and treated in aqueous solution first with 0.05 to 6 millimols of a hypohalogen compound per part by weight of said soap and then with 0.02 to 50 millimols hydrogen peroxide per part by weight of said soap in an aqueous solution having a pH above 7.

9. The process of claim 8 in which said hypohalogen compound is a hypochlorite.

10. The process of claim 8 in which said hypohalogen compound is sodium hypochlorite.

11. The process of claim 7 in which said rosin acid soap is a soap of abietic acid.

12. The process of claim 7 in which said rosin acid soap is a soap of tetrahydroabietic acid.

13. The process of claim 7 in which said rosin acid soap is a soap of dehydroabietic acid.

14. In the polymerization of an unsaturated organic compound containing an active $CH_2=C<$ group, and polymerizable in aqueous emulsion to produce a linear polymer of high molecular weight, while dispersed in an aqueous medium at a polymerization temperature in the presence of an emulsifying agent, the improvement which comprises incorporating in said aqueous medium prior to said polymerization a salt of an alkali metal and at least one rosin acid of the class consisting of natural rosin acids and hydrogenation, dehydrogenation, and disproportionation reaction products thereof having the same number of carbon atoms per molecule and the same arrangement of carbon atoms as said natural rosin acids, said salt being obtained from mixing and treating an alkali metal salt of said acid while in aqueous solution having a pH above 7 at a temperature between 120° F. and the boiling point of said solution with hydrogen peroxide in an amount between 0.5 and 20 millimols per part by weight of said salt, until no unreacted hydrogen peroxide remains.

15. The process of claim 14 in which prior to said mixing and treating with hydrogen peroxide, said salt is mixed and treated in aqueous solution with 0.05 to 6 millimols, per part by weight of said salt, of a hypohalogen compound selected from the group consisting of hypohalogen acids and their alkali metal salts.

16. The process of claim 15 in which said hypohalogen compound is a hypochlorite.

17. The process of claim 14 in which said salt is a potassium salt.

CARL A. URANECK.
SPENCER H. LANDES.

REFERENCES CITED

The following references are of record in the file of this patent:

UNITED STATES PATENTS

| Number | Name | Date |
|---|---|---|
| 2,434,643 | Drake | Jan. 20, 1948 |

OTHER REFERENCES

Shearon, Jr., et al., Ind. and Eng. Chem., May 1948, pp. 769–777.